(12) United States Patent
Teng et al.

(10) Patent No.: US 12,420,939 B2
(45) Date of Patent: Sep. 23, 2025

(54) UNMANNED DEVICE CONTROL (71) Applicant: Beijing Sankuai Online Technology Co., Ltd., Beijing (CN)

(72) Inventors: Xiong Teng, Beijing (CN); Tianbao Zhang, Beijing (CN); Baoxu Liu, Beijing (CN); Gang Chen, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 20 days.

(21) Appl. No.: 18/570,634

(22) PCT Filed: Apr. 11, 2022

(86) PCT No.: PCT/CN2022/086144
§ 371 (c)(1),
(2) Date: Dec. 15, 2023

(87) PCT Pub. No.: WO2023/045301
PCT Pub. Date: Mar. 30, 2023

(65) Prior Publication Data
US 2024/0286752 A1    Aug. 29, 2024

(30) Foreign Application Priority Data
Sep. 22, 2021 (CN) .......................... 202111106333.9

(51) Int. Cl.
*B64D 31/06* (2024.01)
*B64U 50/19* (2023.01)

(52) U.S. Cl.
CPC .............. *B64D 31/06* (2013.01); *B64U 50/19* (2023.01)

(58) Field of Classification Search
CPC ........ B64D 31/06; B64D 27/24; B64U 50/19; B60L 2200/10; B64C 39/024; Y02T 50/60
See application file for complete search history.

(56) References Cited

U.S. PATENT DOCUMENTS

| | | | |
|---|---|---|---|
| 8,473,125 B2 * | 6/2013 | Rischmuller | .......... A63H 30/04 |
| | | | 701/3 |
| 2004/0245378 A1 * | 12/2004 | Nonami | ............... G05D 1/0858 |
| | | | 244/17.13 |

(Continued)

FOREIGN PATENT DOCUMENTS

| | | |
|---|---|---|
| CN | 106385208 A | 2/2017 |
| CN | 106655979 A | 5/2017 |

(Continued)

OTHER PUBLICATIONS

European Patent Office, Extended European Search Report Issued in Application No. 22871364.0, Aug. 13, 2024, Germany, 13 pages.

(Continued)

*Primary Examiner* — Mussa A Shaawat
(74) *Attorney, Agent, or Firm* — Kilpatrick Townsend & Stockton LLP (57) ABSTRACT

Provided is an unmanned device control method and apparatus, a storage medium, and an electronic device. In the method, thrust force required for an unmanned device and a target rotation speed required for providing the thrust force to the unmanned device are determined according to state information and/or environment information of the unmanned device, a voltage inputted into a motor of the unmanned device is adjusted according to the target rotation speed, and the unmanned device is controlled by using an adjusted voltage.

20 Claims, 2 Drawing Sheets

(56) References Cited

U.S. PATENT DOCUMENTS

| | | | |
|---|---|---|---|
| 2013/0173088 A1* | 7/2013 | Callou | A63H 30/04 |
| | | | 701/2 |
| 2013/0176423 A1* | 7/2013 | Rischmuller | A63H 27/12 |
| | | | 348/114 |
| 2015/0229255 A1 | 8/2015 | Wang et al. | |
| 2017/0073070 A1* | 3/2017 | Xing | B60F 5/02 |
| 2017/0274991 A1* | 9/2017 | Shiosaki | B64U 50/19 |
| 2018/0215482 A1* | 8/2018 | Zhang | B64U 10/14 |
| 2018/0346107 A1* | 12/2018 | Brunner | B63H 21/17 |
| 2019/0009926 A1* | 1/2019 | Hu | B64U 70/99 |
| 2019/0058434 A1 | 2/2019 | Yu | |
| 2019/0118941 A1 | 4/2019 | Iskrev et al. | |
| 2019/0225327 A1* | 7/2019 | Kidakarn | B64U 10/14 |
| 2020/0026269 A1 | 1/2020 | Needham et al. | |
| 2020/0108926 A1* | 4/2020 | Smith | F41H 11/02 |
| 2020/0142398 A1* | 5/2020 | Liu | G05D 1/0016 |
| 2021/0086907 A1 | 3/2021 | Liu et al. | |
| 2021/0139156 A1 | 5/2021 | Hamel et al. | |
| 2021/0216069 A1* | 7/2021 | Koubaa | G08G 5/56 |
| 2021/0216085 A1* | 7/2021 | Wake | G05D 1/102 |
| 2022/0050476 A1* | 2/2022 | Adams | G05D 1/0858 |
| 2022/0236746 A1* | 7/2022 | Wahren | B64U 10/16 |
| 2024/0034488 A1* | 2/2024 | Kim | B64U 10/14 |

FOREIGN PATENT DOCUMENTS

| | | |
|---|---|---|
| CN | 108390603 A | 8/2018 |
| CN | 109195867 A | 1/2019 |
| CN | 110247609 A | 9/2019 |
| CN | 110554703 A | 12/2019 |
| CN | 110654536 A | 1/2020 |
| CN | 110803026 A | 2/2020 |
| CN | 112731957 A | 4/2021 |
| CN | 112956126 A | 6/2021 |
| CN | 112987797 A | 6/2021 |
| CN | 113859554 A | 12/2021 |
| JP | 5887641 B1 | 3/2016 |
| JP | 2019221078 A | 12/2019 |
| JP | 2021030971 A | 3/2021 |
| WO | 2018027925 A1 | 2/2018 |

OTHER PUBLICATIONS

ISA State Intellectual Property Office of the People's Republic of China, International Search Report Issued in Application No. PCT/CN2022/086144, Jul. 6, 2022, WIPO, 4 pages.

ISA State Intellectual Property Office of the People's Republic of China, Written Opinion of the International Searching Authority Issued in Application No. PCT/CN2022/086144, Jul. 6, 2022, WIPO, 7 pages.(Submitted with Machine/Partial Translation).

State Intellectual Property Office of the People's Republic of China, Office Action and Search Report Issued in Application No. 2021111063339, Sep. 22, 2022, 8 pages. (Submitted with Machine/Partial Translation).

Japanese Patent Office, Office Action Issued in Application No. 2023-574597, Dec. 3, 2024, 9 pages. (Submitted with Machine Translation).

Australian Patent Office, Office Action Issued in Application No. 2022350044, Nov. 20, 2024, 4 pages.

* cited by examiner

UNMANNED DEVICE CONTROL

CROSS-REFERENCE TO RELATED APPLICATIONS

This application is a national stage of international PCT Application No. PCT/CN2022/086144 filed on Apr. 11, 2022, and claims a priority to a Chinese Patent Application with the corresponding application number being 202111106333.9 and the application date being Sep. 22, 2021, the entire contents of which are incorporated herein by reference.

TECHNICAL FIELD

The present disclosure relates to the field of unmanned driving technologies, and in particular, to an unmanned device control method and apparatus, a storage medium, and an electronic device.

BACKGROUND

With the continuous development of unmanned driving technologies and new energy technologies, an electric unmanned device driven by electric power gradually becomes popular. Different from using oil or coal as energy, a main power source of the electric unmanned device is a power battery mounted in the electric unmanned device.

Using an electric unmanned aerial vehicle as an example, a power battery is mounted in the electric unmanned aerial vehicle. In a flight process of the electric unmanned aerial vehicle, through a voltage inputted by the power battery to the unmanned aerial vehicle, each motor in the electric unmanned aerial vehicle can obtain power to cause the unmanned aerial vehicle to rotate, and the electric unmanned aerial vehicle obtains power required for flying through rotation of each motor.

SUMMARY

The present disclosure provides an unmanned device control method, including: determining, according to state information and/or environment information of an unmanned device, thrust force required for the unmanned device and a target rotation speed required for a motor of the unmanned device to provide the thrust force; determining whether a difference between the target rotation speed and a rotation speed threshold corresponding to a first voltage is less than a first threshold; and adjusting, if the difference is less than the first threshold, the first voltage inputted into the motor of the unmanned device according to the target rotation speed to obtain a target voltage, and controlling the unmanned device by using the target voltage.

In some embodiments, the rotation speed threshold includes a rotation speed upper limit threshold and a rotation speed lower limit threshold.

In some embodiments, the state information of the unmanned device includes: at least one of a weight, an acceleration, or a speed of the unmanned device.

In some embodiments, the determining, according to state information and/or environment information of an unmanned device, thrust force required for the unmanned device includes: determining a target state that the unmanned device needs to reach at a specified moment; and determining the thrust force required for the unmanned device according to the state information, the environment information, and the target state of the unmanned device at a current moment.

In some embodiments, the adjusting the first voltage inputted into the motor of the unmanned device according to the target rotation speed to obtain a target voltage, and controlling the unmanned device by using the target voltage includes: determining, according to the target rotation speed, a target rotation speed threshold corresponding to the target rotation speed; determining, according to the target rotation speed threshold, the target voltage corresponding to the target rotation speed threshold; and adjusting the first voltage inputted into the motor of the unmanned device according to the target voltage.

In some embodiments, a difference between the target rotation speed and a rotation speed threshold corresponding to the target voltage is not less than a second threshold.

In some embodiments, the determining a target rotation speed threshold corresponding to the target rotation speed includes: determining a target rotation speed upper limit threshold and a target rotation speed lower limit threshold corresponding to the target rotation speed; and the determining, according to the target rotation speed threshold, the target voltage corresponding to the target rotation speed threshold includes: determining, according to the target rotation speed upper limit threshold and the target rotation speed lower limit threshold, a target rotation speed range from the target rotation speed lower limit threshold to the target rotation speed upper limit threshold; and determining, according to the target rotation speed range, the target voltage corresponding to the target rotation speed range.

The present disclosure provides an unmanned device control apparatus, including: a target voltage determining module, configured to determine, according to state information and/or environment information of an unmanned device, thrust force required for the unmanned device and a target rotation speed required for a motor of the unmanned device to provide the thrust force; and a voltage adjustment module, configured to: determine whether a difference between the target rotation speed and a rotation speed threshold corresponding to a first voltage is less than a first threshold; and adjust, if the difference is less than the first threshold, the first voltage inputted into the motor of the unmanned device according to the target rotation speed to obtain a target voltage, and control the unmanned device by using the target voltage.

The present disclosure provides a computer-readable storage medium, storing a computer program, where when the computer program is executed by a processor, the foregoing unmanned device control method is implemented.

The present disclosure provides an unmanned device, including a memory, a processor, and a computer program stored in the memory and executable on the processor, where when executing the program, the processor implements the foregoing unmanned device control method.

At least one of the foregoing technical solutions adopted in the present disclosure can achieve the following beneficial effects:

In the unmanned device control method provided in the present disclosure, thrust force required for an unmanned device and a target rotation speed required for a motor of the unmanned device to provide the thrust force are determined according to state information and/or environment information of the unmanned device, a voltage inputted into the motor of the unmanned device is adjusted according to the target rotation speed, and the unmanned device is controlled by using an adjusted voltage.

It may be learned from the foregoing method that, in this method, by adjusting the voltage inputted into the motor of the unmanned device, a problem of power saturation of the unmanned device may be avoided.

BRIEF DESCRIPTION OF DRAWINGS

The accompanying drawings described herein are used to provide a further understanding of the present disclosure, and form a part of the present disclosure. Exemplary embodiments of the present disclosure and description thereof are used to explain the present disclosure, and do not constitute any limitation to the present disclosure. In the accompanying drawings.

DETAILED DESCRIPTION

An unmanned device obtains power from rotation of a motor mounted in the unmanned device, and a power source of rotation of the motor is a voltage outputted by a power battery mounted on the unmanned device. When the unmanned device is interfered with by the outside during operation, a rotation speed of the motor may be increased or decreased, so that the unmanned device can still operate normally. When the rotation speed of the motor is excessively close to a rotation speed upper limit or lower limit corresponding to a current voltage, although the rotation speed still falls within a range corresponding to the rotation speed upper limit or lower limit, a problem of power saturation may occur. As a result, the control performance of an electric unmanned aerial vehicle is decreased, and the electric unmanned aerial vehicle may even be out of control and cannot fly according to a preset target state.

When the electric unmanned aerial vehicle encounters relatively large external resistance during flight, for example, when the electric unmanned aerial vehicle flies against the wind, to ensure that the electric unmanned aerial vehicle can fly normally, the rotation speed of each motor of the electric unmanned aerial vehicle may be increased, so that the electric unmanned aerial vehicle can obtain sufficient thrust force. Alternatively, when the electric unmanned aerial vehicle encounters an updraft, to ensure that the electric unmanned aerial vehicle can fly normally, the rotation speed of each motor of the electric unmanned aerial vehicle may be decreased, so that thrust force to the electric unmanned aerial vehicle is reduced. However, when the rotation speed of each motor is excessively high or excessively low, the problem of power saturation of the electric unmanned aerial vehicle may occur. Therefore, how to avoid power saturation when controlling the unmanned device to execute tasks is a problem that needs to be resolved urgently.

In this solution, by adjusting the voltage inputted into the motor of the unmanned device, a rotation speed threshold of the motor of the unmanned device is changed, so that the problem of power saturation of the unmanned device is avoided and the unmanned device can still execute tasks according to the target state.

To make the objectives, technical solutions, and advantages of the present disclosure clearer, the technical solutions of the present disclosure are clearly and completely described below with reference to specific embodiments of the present disclosure and the corresponding accompanying drawings. Apparently, the described embodiments are only some embodiments rather than all the embodiments of the present disclosure. Based on the embodiments in the present disclosure, all other embodiments obtained by a person of ordinary skill in the art without creative efforts all fall within the protection scope of the present disclosure.

The following describes the technical solutions provided in the embodiments of the present disclosure in detail with reference to the accompanying drawings.

Figure 1:
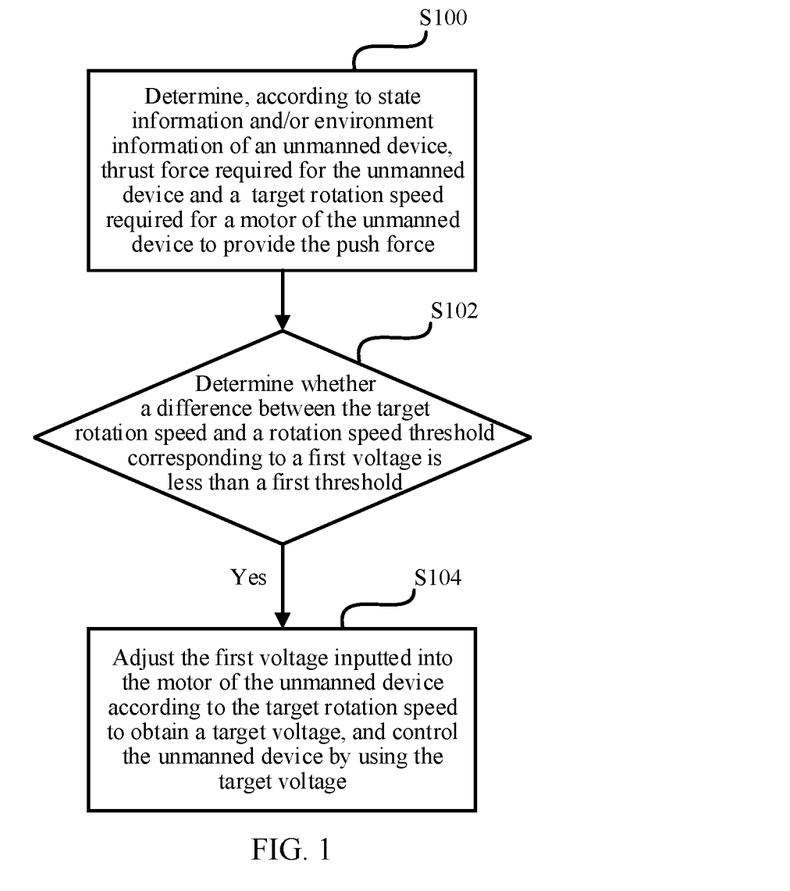
FIG. 1 is a schematic flowchart of an unmanned device control method according to an embodiment of the present disclosure.

FIG. 1 is a schematic flowchart of an unmanned device control method according to an embodiment of the present disclosure, and includes step S100 to step S104.

S100: Thrust force required for the unmanned device and a target rotation speed required for a motor of the unmanned device to provide the thrust force are determined according to state information and/or environment information of an unmanned device.

The unmanned device control method provided in the present disclosure may be performed by an unmanned device or may be performed by an electronic device that can control the unmanned device, for example, a notebook computer, a mobile phone, a service, or the like, which is not limited in the present disclosure. The following is described by merely using an example in which an execution entity is an unmanned device.

The unmanned device mentioned in the present disclosure may include a device that can implement self-driving such as an unmanned aerial vehicle, an unmanned vehicle, a robot, or an automatic delivery device. Based on this, the unmanned device to which the unmanned device control method provided in the present disclosure is applied may be configured to execute a delivery task in the delivery field, for example, a delivery service scenario in which the unmanned device is used to perform express delivery, logistics distribution, or take-out delivery. The following is described by merely using an example in which the unmanned device is an unmanned aerial vehicle.

In some embodiments, an unmanned driving system in the unmanned aerial vehicle may plan, according to received task information sent by a server, a target route for the unmanned aerial vehicle to execute a task. In a task execution process, the unmanned aerial vehicle may fly according to the pre-planned target route. That is, every moment the unmanned aerial vehicle needs to reach a pre-planned target state. In addition, the unmanned aerial vehicle may monitor state information of the unmanned aerial vehicle and surrounding environment information in real time, to ensure the safety of the unmanned aerial vehicle during task execution.

The state information includes: at least one of a weight, a speed, or an acceleration of the unmanned aerial vehicle, where the weight of the unmanned aerial vehicle may include the weight of the unmanned aerial vehicle or may alternatively include a weight loaded by the unmanned aerial vehicle. For example, when the unmanned aerial vehicle executes a logistics distribution task, after the unmanned aerial vehicle loads products that need to be delivered, the weight of the unmanned aerial vehicle may be increased, and the motor of the unmanned aerial vehicle needs to increase the rotation speed to enable the unmanned aerial vehicle to fly in the target state. In this case, the rotation speed of the motor of the unmanned aerial vehicle may reach a rotation speed upper limit threshold, and the unmanned aerial vehicle may encounter the problem of power saturation. Similarly, after the unmanned aerial vehicle delivers the products, the weight loaded by the unmanned aerial vehicle is reduced, and the unmanned aerial vehicle may decrease the rotation speed, so that the unmanned aerial vehicle can still fly in the target state. In this case, the rotation speed of the motor of the unmanned aerial vehicle may reach a rotation speed lower limit threshold, and the unmanned aerial vehicle may also encounter the problem of power saturation.

In addition, the target state includes: at least one of the speed or the acceleration of the unmanned aerial vehicle. The environment information monitored by the unmanned aerial vehicle includes a wind speed, and may further include other environmental conditions such as rainfall, which is not limited in the present disclosure. In addition, when the unmanned device is an unmanned vehicle, the environment information may further include a traveling slope of the unmanned vehicle.

To enable the unmanned aerial vehicle to fly in the target state in any time, the unmanned aerial vehicle may determine resistance encountered by the unmanned aerial vehicle according to an environment at a current moment, and then determine, according to a difference between an actual state and the target state at the current moment of the unmanned aerial vehicle, thrust force required for enabling the unmanned aerial vehicle to reach the target state at a specified moment. The specified moment may be the current moment or may be another moment, which is not limited in the present disclosure.

The power of the unmanned aerial vehicle during flight is from the rotation of the motor, a higher rotation speed of the motor indicates greater thrust force that the unmanned aerial vehicle can obtain, and conversely, a lower rotation speed of the motor indicates smaller thrust force that the unmanned aerial vehicle can obtain. Therefore, according to the required thrust force, the unmanned aerial vehicle may determine the target rotation speed required for the motor to provide the thrust force.

For example, in a windless environment, according to a pre-planned route, the unmanned aerial vehicle needs to fly from a place A to a place C at a speed of 10 m/s, and when a voltage inputted to the motor of the unmanned aerial vehicle is 4 V and the rotation speed of the motor of the unmanned aerial vehicle is 1500 rpm, the unmanned aerial vehicle can fly according to the speed of 10 m/s. A motor rotation speed corresponding to the voltage 4 V ranges from 1000 rpm to 2000 rpm, and the unmanned aerial vehicle may not encounter the problem of power saturation. During flight of the unmanned aerial vehicle, the unmanned aerial vehicle monitors an actual state of the unmanned aerial vehicle and environmental conditions such as a wind speed of a position at which the unmanned aerial vehicle is located.

When the unmanned aerial vehicle flies to a place B, the unmanned aerial vehicle encounters a strong wind weather and flies against the wind, the unmanned aerial vehicle can only fly at a speed of 5 m/s if the rotation speed of the motor at the current moment is still 1500 rpm. The unmanned aerial vehicle may determine, according to a monitored wind speed, the actual state at the current moment, and the target state that the unmanned aerial vehicle needs to reach, that the required thrust force of the unmanned aerial vehicle at the current moment is 20 N, and may determine, according to that the required thrust force of the unmanned aerial vehicle at the current moment is 20 N, that the target rotation speed required for the motor of the unmanned aerial vehicle to provide the thrust force 20 N is 1900 rpm.

S102: Whether a difference between the target rotation speed and a rotation speed threshold corresponding to a first voltage being less than a first threshold is determined, and if yes, S104 is performed.

In some embodiments, to prevent the unmanned aerial vehicle from encountering the problem of power saturation, the unmanned driving system in the unmanned aerial vehicle may determine whether the difference between the target rotation speed determined in step S100 and the rotation speed threshold corresponding to the first voltage is less than the first threshold, to determine whether the first voltage inputted into the motor of the unmanned device needs to be adjusted. For example, the unmanned driving system determines whether a value obtained by subtracting a rotation speed lower limit threshold corresponding to the first voltage inputted into the motor of the unmanned aerial vehicle from the target rotation speed is less than the first threshold, or determines whether a value obtained by subtracting the target rotation speed from a rotation speed upper limit threshold corresponding to the first voltage inputted into the motor of the unmanned aerial vehicle is less than the first threshold. The first voltage may be a voltage inputted into the motor of the unmanned device at the current moment, which is not limited in the present disclosure.

When the rotation speed of the motor of the unmanned aerial vehicle is excessively high or low, the problem of power saturation may occur, so that the rotation speed threshold includes a rotation speed upper limit threshold and a rotation speed lower limit threshold.

S104: The first voltage inputted into the motor of the unmanned device according to the target rotation speed is adjusted to obtain a target voltage, and control the unmanned device by using the target voltage.

When an absolute value of the difference between the target rotation speed and the rotation speed threshold at the current moment is less than the first threshold, it indicates that the target rotation speed is about to reach the rotation speed threshold and the unmanned aerial vehicle may encounter the problem of power saturation, and the unmanned aerial vehicle may adjust the voltage to avoid the problem of power saturation.

In some embodiments, it may be learned from step S100 that, when the rotation speed of the motor of the unmanned aerial vehicle is close to the rotation speed threshold corresponding to the first voltage (the voltage at the current moment), the unmanned aerial vehicle generally may encounter the problem of power saturation. To ensure that the unmanned aerial vehicle may not encounter the problem of power saturation when the target rotation speed is reached, a target rotation speed upper limit threshold and a target rotation speed lower limit threshold whose differences with the target rotation speed are not less than a second threshold may be determined, a corresponding rotation speed range from the rotation speed lower limit threshold to the rotation speed upper limit threshold is further determined, and the determined rotation speed range is used as a target rotation speed range.

In addition to being related to structure parameters of the motor, the rotation speed of the motor is also related to the voltage inputted into the motor. A highest rotation speed and a lowest rotation speed of the motor of the unmanned aerial vehicle are different under different voltages, and as the voltage increases or decreases, the highest rotation speed and the lowest rotation speed of the motor also increase or decrease.

Therefore, the unmanned device may determine, according to a target rotation speed threshold, a target voltage corresponding to the target rotation speed threshold. It should be noted that, the range from the target rotation speed lower limit threshold to the target rotation speed upper limit threshold is the target rotation speed range, and each rotation speed range corresponds to one target voltage, so that a target rotation speed lower limit threshold and a target rotation speed upper limit threshold corresponding to a same target rotation speed correspond to a same target voltage.

It should be noted that, a rotation speed threshold to the target voltage includes a target rotation speed upper limit threshold and a target rotation speed lower limit threshold, and it may be learned from the foregoing description that, a difference between the target rotation speed and the rotation speed threshold corresponding to the target voltage (the target rotation speed upper limit threshold and the target rotation speed lower limit threshold) is not less than the second threshold.

In the embodiments of the present disclosure, a transformation module that can adjust the voltage inputted into the motor is mounted between the power battery and each motor of the unmanned aerial vehicle. After determining the target voltage inputted into the motor according to the foregoing method, the unmanned aerial vehicle adjusts the first voltage (the actual voltage at the current moment) to the target voltage through the transformation module, so that the motor can reach the target rotation speed under an adjusted voltage (the target voltage), and the problem of power saturation may not occur.

Based on the foregoing example, although the target rotation speed does not exceed the rotation speed upper limit 2000 rpm corresponding to the actual voltage 4 V at the current moment, a difference between the target rotation speed 1900 rpm and the current rotation speed upper limit 2000 rpm is only 100 rpm, and the unmanned aerial vehicle may encounter the problem of power saturation. Therefore, the unmanned aerial vehicle may determine, according to the target rotation speed 1900 rpm, a target rotation speed lower limit threshold 1400 rpm and a target rotation speed upper limit threshold 2400 rpm whose differences with the target rotation speed is not less 500 rpm, so that a target rotation speed range from 1400 rpm to 2400 rpm may be determined.

According to the target rotation speed range from 1400 rpm to 2400 rpm, the unmanned aerial vehicle may determine that a target voltage corresponding to the target rotation speed range from 1400 rpm to 2400 rpm is 4.8 V.

The transformation module mounted in the unmanned aerial vehicle adjusts the voltage 4 V inputted into the motor to 4.8 V. After the voltage inputted into the unmanned aerial vehicle is adjusted to 4.8 V, when the motor of the unmanned aerial vehicle reaches the target rotation speed 1900 rpm, at the current moment, the rotation speed lower limit threshold is 1400 rpm, the rotation speed upper limit threshold is 2400 rpm, and the differences between the rotation speed of the motor of the unmanned aerial vehicle and the rotation speed upper limit threshold and the rotation speed lower limit threshold at the current moment are both not less than 500 rpm, so that the unmanned aerial vehicle can still fly at the speed of 10 m/s in the environment of being against the wind at the current moment, and the problem of power saturation may not occur.

When the absolute value of the difference between the target rotation speed and the rotation speed threshold at the current moment is not less than the first threshold, it indicates that the unmanned aerial vehicle currently may not encounter the problem of power saturation, and therefore, the voltage inputted into the motor of the unmanned aerial vehicle does not need to be adjusted. The unmanned aerial vehicle may continue to use an actual voltage at the current moment to control the unmanned aerial vehicle.

In addition to adjusting the voltage inputted into the motor for the problem that the unmanned aerial vehicle encounters power saturation, when the target rotation speed of the unmanned aerial vehicle is higher than the rotation speed upper limit threshold corresponding to the first voltage (the actual voltage inputted into the motor at the current moment) or lower than the rotation speed lower limit threshold corresponding to the first voltage (the actual voltage inputted into the motor at the current moment), the unmanned aerial vehicle may also use this method to adjust the voltage inputted into the motor. In some embodiments, before the voltage inputted into the motor is adjusted, the unmanned aerial vehicle may determine an actual rotation speed range corresponding to the first voltage (the actual voltage inputted into the motor at the current moment), and adjust, when determining that the target rotation speed is not within the actual rotation speed range, the voltage inputted into the motor according to the target rotation speed, where the actual rotation speed range includes the rotation speed upper limit threshold and the rotation speed lower limit threshold corresponding to the actual voltage inputted into the motor.

In addition, when the target rotation speed of the unmanned aerial vehicle reaches or is close to the rotation speed upper limit threshold corresponding to the voltage inputted into the motor at the current moment, the unmanned aerial vehicle encounters the problem of power saturation, and when the target rotation speed of the unmanned aerial vehicle reaches or is close to the rotation speed lower limit threshold corresponding to the first voltage (the voltage inputted into the motor at the current moment), the unmanned aerial vehicle also encounters the problem of power saturation, so that the unmanned aerial vehicle may adjust the voltage inputted into the motor by using step S100 to step S104, to prevent the unmanned aerial vehicle from encountering the problem of power saturation.

It may be seen from the foregoing method that, in this method, by adjusting the voltage inputted into the motor of the unmanned device, the rotation speed upper limit threshold or the rotation speed lower limit threshold that the motor of the unmanned aerial vehicle can reach is adjusted, thereby preventing the unmanned aerial vehicle from encountering the problem of power saturation. In other words, the rotation speed of the motor is prevented from reaching a motor rotation speed threshold corresponding to the current voltage.

In an actual operation, during flight of the unmanned aerial vehicle, a power module mounted on the unmanned aerial vehicle may send a rotation speed instruction to the motor, and after receiving the rotation speed instruction sent by the power module, the motor may adjust the rotation speed of the motor to a specified rotation speed corresponding to the rotation speed instruction. The rotation speed instruction includes a specified rotation speed ratio used for causing the motor of the unmanned aerial vehicle to operate according to a rotation speed corresponding to the specified rotation speed ratio, where the specified rotation speed ratio is a ratio of a corresponding rotation speed range from a rotation speed lower limit threshold to a rotation speed upper limit threshold under the current voltage. In some embodiments, the motor of the unmanned aerial vehicle may determine, according to the specified rotation speed ratio in the received rotation speed instruction and the rotation speed range corresponding to the current voltage, the specified rotation speed corresponding to the specified rotation speed ratio, and operate according to the determined specified rotation speed. For example, when the specified rotation speed ratio in the rotation speed instruction is 0%, a corresponding rotation speed is the rotation speed lower limit threshold under the current voltage, and when the specified rotation speed ratio in the rotation speed instruction is 100%, a corresponding rotation speed is the rotation speed upper limit threshold under the current voltage. In an actual operation, to ensure the controllability of the unmanned aerial vehicle and enable the unmanned aerial vehicle to fly in an optimal state, a rotation speed instruction whose specified rotation speed ratio is 50% is generally used to control the rotation speed of the motor.

Therefore, the transformation module of the unmanned aerial vehicle may determine the target rotation speed threshold according to the rotation speed instruction at the current moment and the target rotation speed, and then determine the target voltage corresponding to the target rotation speed threshold according to the determined target rotation speed threshold. In this way, the unmanned aerial vehicle only needs to change the voltage to enable the rotation speed of the motor of the unmanned aerial vehicle to remain within an ideal range in any time, and the unmanned aerial vehicle may be prevented from encountering the problem of power saturation.

For example, the unmanned aerial vehicle determines that the target rotation speed is 1750 rpm through step S100, and the transformation module of the unmanned aerial vehicle determines that the target rotation speed range is from 1500 rpm to 2000 rpm according to the rotation speed instruction whose specified rotation speed ratio is 50% and the target rotation speed 1750 rpm. The transformation module may determine that the target voltage corresponding to the target rotation speed range from 1500 rpm to 2000 rpm is 4.7 V, and adjust the voltage outputted by the power battery to the target voltage 4.7 V and input the adjusted voltage to the motor.

In addition, not only the unmanned aerial vehicle can use this method, another unmanned device may also use this method, for example, an unmanned vehicle, where the unmanned aerial vehicle operates depending on the power battery mounted on the unmanned aerial vehicle.

Figure 2:
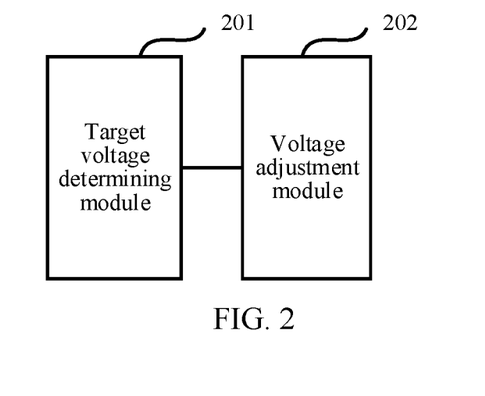
FIG. 2 is a schematic diagram of an unmanned device control apparatus according to an embodiment of the present disclosure.

The foregoing describes the unmanned device control method provided in one or more embodiments of the present disclosure, and based on the same concept, the present disclosure further provides a corresponding unmanned device control apparatus, as shown in FIG. 2.

FIG. 2 is a schematic diagram of an unmanned device control apparatus according to the present disclosure. The unmanned device control apparatus includes: a target voltage determining module 201 and a voltage adjustment module 202.

The target voltage determining module 201 is configured to determine, according to state information and/or environment information of an unmanned device, thrust force required for the unmanned device and a target rotation speed required for a motor of the unmanned device to provide the thrust force; and The voltage adjustment module 202 is configured to: determine whether a difference between the target rotation speed and a rotation speed threshold corresponding to a first voltage is less than a first threshold; and adjust, if the difference is less than the first threshold, the first voltage inputted into the motor of the unmanned device according to the target rotation speed to obtain a target voltage, and control the unmanned device by using the target voltage.

In some embodiments, the rotation speed threshold includes a rotation speed upper limit threshold and a rotation speed lower limit threshold.

In some embodiments, the state information of the unmanned device includes: at least one of a weight, an acceleration, or a speed of the unmanned device.

In some embodiments, the target voltage determining module 201 is configured to: determine a target state that the unmanned device needs to reach at a specified moment; and determine the thrust force required for the unmanned device according to state information, the environment information, and the target state of the unmanned device at a current moment.

In some embodiments, the voltage adjustment module 202 is configured to: determine, according to the target rotation speed, a target rotation speed threshold corresponding to the target rotation speed; determine, according to the target rotation speed threshold, the target voltage corresponding to the target rotation speed threshold; and adjust the first voltage inputted into the motor of the unmanned device according to the target voltage.

In some embodiments, a difference between the target rotation speed and a rotation speed threshold corresponding to the target voltage is not less than a second threshold.

In some embodiments, the target voltage determining module 201 is configured to: determine a target rotation speed upper limit threshold and a target rotation speed lower limit threshold corresponding to the target rotation speed; determine, according to the target rotation speed upper limit threshold and the target rotation speed lower limit threshold, a target rotation speed range from the target rotation speed lower limit threshold to the target rotation speed upper limit threshold; and determine, according to the target rotation speed range, the target voltage corresponding to the target rotation speed range.

The present disclosure further provides a computer-readable storage medium, storing a computer program, where the computer program may be used for performing the unmanned device control method provided in FIG. 1.

Figure 3:
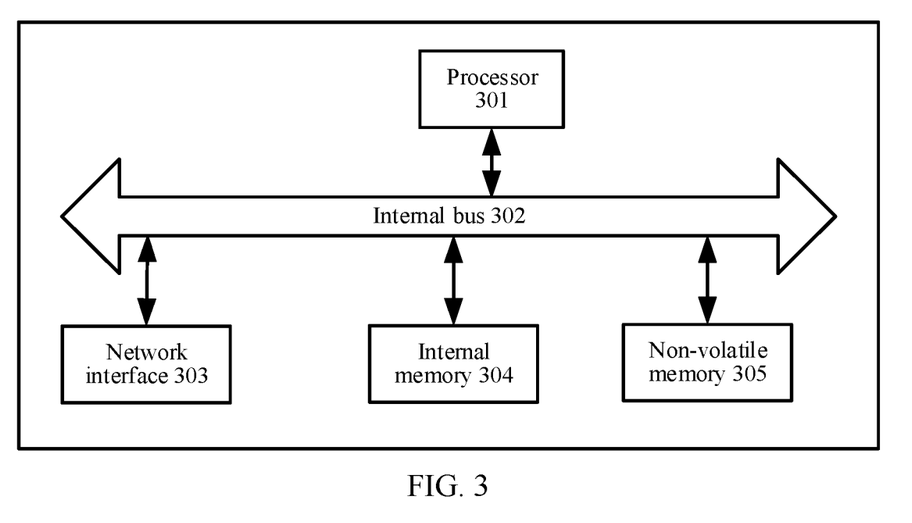
FIG. 3 is a schematic diagram of an electronic device corresponding to FIG. 1 according to an embodiment of the present disclosure.

The present disclosure further provides a schematic structural diagram of an electronic device shown in FIG. 3. As shown in FIG. 3, at a hardware level, the unmanned device includes a processor 301, an internal bus 302, a network interface 303, an internal memory 304, and a non-volatile memory 305, and may further include hardware required for other services. The processor reads a corresponding computer program from the non-volatile memory into the internal memory and then executes the computer program, to implement the unmanned device control method described in FIG. 1. In addition to a software implementation, the present disclosure does not exclude other implementations, for example, a logic device or a combination of software and hardware. That is, an entity executing the following processing procedure is not limited to the logic units, and may also be hardware or logic devices.

In the 1990s, improvements in a technology may be clearly categorized as hardware improvements (for example, improvements of a circuit structure such as a diode, a transistor, or a switch) and software improvements (improvements of a method procedure). However, with the development of technologies, currently, improvements of many method procedures may be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) (for example, a field programmable gate array (FPGA)) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller may be implemented in any suitable manner, for example, the controller may take the form of, for example, a microprocessor or processor and a computer-readable medium storing computer-readable program code (for example, software or firmware) executable by the microprocessor or processor, a logic gate, a switch, an application-specific integrated circuit (ASIC), a programmable logic controller, and an embedded microcontroller. Examples of the controller include, but are not limited to, the following microcontrollers: ARC 625D, Atmel AT9ISAM, Microchip PIC18F26K20, and Silicone Labs C8051F320. The memory controller may also be implemented as part of the memory control logic. A person skilled in the art may also appreciate that, in addition to implementing the controller in the form of pure computer-readable program code, it is also possible to implement, by logically programming the method steps, the controller in the form of a logic gate, a switch, an ASIC, a programmable logic controller, and an embedded microcontroller to achieve the same function. Such a controller may be considered as a hardware component and apparatuses included therein for implementing various functions may also be considered as structures inside the hardware component. Alternatively, apparatuses configured to implement various functions may be considered as both software modules implementing the method and structures inside the hardware component.

The system, the apparatus, the module or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of the present disclosure, the functions of the units may be implemented in a same piece of or multiple pieces of software and/or hardware.

A person skilled in the art should understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer-usable storage media (including but not limited to a disk memory, a CD-ROM, and an optical memory) including computer-usable program code.

The present disclosure is described with reference to flowcharts and/or block diagrams of the method, the device (system), and the computer program product in the embodiments of the present disclosure. It may be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may also be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), an input/output interface, a network interface, and an internal memory.

The internal memory may include a form such as a persistent memory, a random-access memory (RAM) and/or a non-volatile memory of computer readable media, for example, a read-only memory (ROM) or a flash memory (flash RAM). The internal memory is an example of the computer-readable medium.

The computer-readable medium includes a non-volatile medium and a volatile medium, a movable medium and a non-movable medium, which may implement storage of information by using any method or technology. The information may be a computer-readable instruction, a data structure, a program module, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should be further noted that, the term "include", "comprise", or any variant thereof is intended to cover a non-exclusive inclusion. Therefore, a process, a method, a product, or a device that includes a series of elements not only includes such elements, but also includes other elements not expressly listed, or may include elements inherent to the process, the method, the product, or the device. Without further limitations, an element limited by "include a/an . . . " does not exclude other same elements existing in the process, the method, the product, or the device that includes the element.

A person skilled in the art should understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may use a form of a computer program product implemented on one or more computer-usable storage media (including but not limited to a disk memory, a CD-ROM, and an optical memory) including computer-usable program code.

The present disclosure may be described in the general context of computer-executable instructions executed by a computer, for example, a program module. Generally, the program module includes a routine, a program, an object, a component, a data structure, and the like for executing a particular task or implementing a particular abstract data type. The present disclosure may alternatively be practiced in distributed computing environments in which tasks are executed by remote processing devices that are connected by using a communication network. In a distributed computing environment, the program module may be located in both local and remote computer storage media including storage devices.

The embodiments in the present disclosure are all described in a progressive manner, for same or similar parts in the embodiments, reference may be made to these embodiments, and description of each embodiment focuses on differences from other embodiments. Especially, a system embodiment is basically similar to a method embodiment, and therefore is described briefly; for related parts, reference may be made to partial description in the method embodiment.

The foregoing is merely the embodiments of the present disclosure, and is not intended to limit the present disclosure. For a person skilled in the art, various modifications and variations may be made to the present disclosure. Any modification, equivalent replacement, or improvement made without departing from the spirit and principle of the present disclosure shall fall within the scope of the claims of the present disclosure.

The invention claimed is:

1. An unmanned device control method, comprising:
   determining, according to state information and environment information of an unmanned device, thrust force required for the unmanned device and a target rotation speed required for a motor of the unmanned device to provide the thrust force, wherein the environment information comprises a wind speed;
   determining whether a difference between the target rotation speed and a rotation speed threshold corresponding to a first voltage is less than a first threshold; and
   adjusting, in response to determining that the difference is less than the first threshold, the first voltage inputted into the motor of the unmanned device according to the target rotation speed to obtain a target voltage, and controlling the unmanned device by using the target voltage.

2. The method according to claim 1, wherein the rotation speed threshold comprises a rotation speed upper limit threshold and a rotation speed lower limit threshold.

3. The method according to claim 1, wherein the state information of the unmanned device comprises: at least one of a weight, an acceleration, or a speed of the unmanned device.

4. The method according to claim 1, wherein determining, according to state information and/or environment information of the unmanned device, the thrust force required for the unmanned device comprises:
   determining a target state that the unmanned device needs to reach at a specified moment; and
   determining the thrust force required for the unmanned device according to the state information, the environment information, and the target state of the unmanned device at a current moment.

5. The method according to claim 2, wherein adjusting the first voltage inputted into the motor of the unmanned device according to the target rotation speed to obtain the target voltage, and controlling the unmanned device by using the target voltage comprises:
   determining, according to the target rotation speed, a target rotation speed threshold corresponding to the target rotation speed;
   determining, according to the target rotation speed threshold, the target voltage corresponding to the target rotation speed threshold; and
   adjusting the first voltage inputted into the motor of the unmanned device according to the target voltage.

6. The method according to claim 5, wherein a difference between the target rotation speed and a rotation speed threshold corresponding to the target voltage is not less than a second threshold.

7. The method according to claim 5, wherein determining the target rotation speed threshold corresponding to the target rotation speed comprises:
   determining a target rotation speed upper limit threshold and a target rotation speed lower limit threshold corresponding to the target rotation speed; and
   determining, according to the target rotation speed threshold, the target voltage corresponding to the target rotation speed threshold comprises:
   determining, according to the target rotation speed upper limit threshold and the target rotation speed lower limit threshold, a target rotation speed range from the target rotation speed lower limit threshold to the target rotation speed upper limit threshold; and determining, according to the target rotation speed range, the target voltage corresponding to the target rotation speed range.

8. A non-volatile computer-readable storage medium, storing a computer program, wherein the computer program is executed by a processor to implement:
   determining, according to state information and/or environment information of an unmanned device, thrust force required for the unmanned device and a target rotation speed required for a motor of the unmanned device to provide the thrust force, wherein the environment information comprises a wind speed;
   determining whether a difference between the target rotation speed and a rotation speed threshold corresponding to a first voltage is less than a first threshold; and
   adjusting, in response to determining that the difference is less than the first threshold, the first voltage inputted into the motor of the unmanned device according to the target rotation speed to obtain a target voltage, and controlling the unmanned device by using the target voltage.

9. An unmanned device, comprising a memory, a processor, and a computer program stored in the memory and executable by the processor, wherein the processor is configured to execute the computer program to implement:
   determining, according to state information and/or environment information of the unmanned device, thrust force required for the unmanned device and a target rotation speed required for a motor of the unmanned device to provide the thrust force, wherein the environment information comprises a wind speed;
   determining whether a difference between the target rotation speed and a rotation speed threshold corresponding to a first voltage is less than a first threshold; and
   adjusting, in response to determining that the difference is less than the first threshold, the first voltage inputted into the motor of the unmanned device according to the target rotation speed to obtain a target voltage, and controlling the unmanned device by using the target voltage.

10. The unmanned device according to claim 9, wherein the rotation speed threshold comprises a rotation speed upper limit threshold and a rotation speed lower limit threshold.

11. The unmanned device according to claim 9, wherein the state information of the unmanned device comprises: at least one of a weight, an acceleration, or a speed of the unmanned device.

12. The unmanned device according to claim 9, wherein determining, according to state information and/or environment information of the unmanned device, the thrust force required for the unmanned device comprises:
   determining a target state that the unmanned device needs to reach at a specified moment; and
   determining the thrust force required for the unmanned device according to the state information, the environment information, and the target state of the unmanned device at a current moment.

13. The unmanned device according to claim 10, wherein adjusting the first voltage inputted into the motor of the unmanned device according to the target rotation speed to obtain the target voltage, and controlling the unmanned device by using the target voltage comprises:
   determining, according to the target rotation speed, a target rotation speed threshold corresponding to the target rotation speed;
   determining, according to the target rotation speed threshold, the target voltage corresponding to the target rotation speed threshold; and
   adjusting the first voltage inputted into the motor of the unmanned device according to the target voltage.

14. The unmanned device according to claim 13, wherein a difference between the target rotation speed and the target rotation speed threshold is not less than a second threshold.

15. The unmanned device according to claim 13, wherein determining the target rotation speed threshold corresponding to the target rotation speed comprises:
   determining a target rotation speed upper limit threshold and a target rotation speed lower limit threshold corresponding to the target rotation speed; and
   determining, according to the target rotation speed threshold, the target voltage corresponding to the target rotation speed threshold comprises:
   determining, according to the target rotation speed upper limit threshold and the target rotation speed lower limit threshold, a target rotation speed range from the target rotation speed lower limit threshold to the target rotation speed upper limit threshold; and
   determining, according to the target rotation speed range, the target voltage corresponding to the target rotation speed range.

16. The non-volatile computer-readable storage medium according to claim 8, wherein the rotation speed threshold comprises a rotation speed upper limit threshold and a rotation speed lower limit threshold; and
   the state information of the unmanned device comprises: at least one of a weight, an acceleration, or a speed of the unmanned device.

17. The non-volatile computer-readable storage medium according to claim 8, wherein determining, according to state information and/or environment information of the unmanned device, the thrust force required for the unmanned device comprises:
   determining a target state that the unmanned device needs to reach at a specified moment; and
   determining the thrust force required for the unmanned device according to the state information, the environment information, and the target state of the unmanned device at a current moment.

18. The non-volatile computer-readable storage medium according to claim 16, wherein adjusting the first voltage inputted into the motor of the unmanned device according to the target rotation speed to obtain the target voltage, and controlling the unmanned device by using the target voltage comprises:
   determining, according to the target rotation speed, a target rotation speed threshold corresponding to the target rotation speed;
   determining, according to the target rotation speed threshold, the target voltage corresponding to the target rotation speed threshold; and
   adjusting the first voltage inputted into the motor of the unmanned device according to the target voltage.

19. The non-volatile computer-readable storage medium according to claim 18, wherein a difference between the target rotation speed and the target rotation speed threshold is not less than a second threshold.

20. The non-volatile computer-readable storage medium according to claim 18, wherein determining the target rotation speed threshold corresponding to the target rotation speed comprises:

determining a target rotation speed upper limit threshold and a target rotation speed lower limit threshold corresponding to the target rotation speed; and determining, according to the target rotation speed threshold, the target voltage corresponding to the target rotation speed threshold comprises:

determining, according to the target rotation speed upper limit threshold and the target rotation speed lower limit threshold, a target rotation speed range from the target rotation speed lower limit threshold to the target rotation speed upper limit threshold; and determining, according to the target rotation speed range, the target voltage corresponding to the target rotation speed range.

* * * * *